United States Patent
Zhang et al.

(10) Patent No.: US 8,828,613 B2
(45) Date of Patent: Sep. 9, 2014

(54) MEMBRANE ELECTRODE ASSEMBLIES AND FUEL-CELL SYSTEMS WITH SURFACE-MODIFIED ELECTROCATALYSTS AND METHODS FOR ELECTROCATALYST SURFACE MODIFICATION

(71) Applicant: GM Global Technology Operations LLC, Detroit, MI (US)

(72) Inventors: Jingxin Zhang, Pittsford, NY (US); Rohit Makharia, Pittsford, NY (US); Jeanette E. Owejan, Honeoye, NY (US)

(73) Assignee: GM Global Technology Operations LLC, Detroit, MI (US)

(*) Notice: Subject to any disclaimer, the term of this patent is extended or adjusted under 35 U.S.C. 154(b) by 65 days.

(21) Appl. No.: 13/799,040

(22) Filed: Mar. 13, 2013

(65) Prior Publication Data

US 2013/0260267 A1    Oct. 3, 2013

Related U.S. Application Data

(60) Provisional application No. 61/617,071, filed on Mar. 29, 2012.

(51) Int. Cl.
*H01M 4/90* (2006.01)
*H01M 8/10* (2006.01)
*H01M 4/88* (2006.01)
*H01M 8/06* (2006.01)
*H01M 4/92* (2006.01)
*H01M 4/86* (2006.01)

(52) U.S. Cl.
CPC .............. *H01M 4/8657* (2013.01); *H01M 8/10* (2013.01); *H01M 8/0662* (2013.01); *H01M 4/923* (2013.01); *H01M 4/9008* (2013.01); *H01M 4/8878* (2013.01); *H01M 8/1002* (2013.01); *Y02E 60/50* (2013.01); *Y02E 60/521* (2013.01)
USPC ........... 429/410; 429/484; 429/485; 429/535; 429/530; 427/115

(58) Field of Classification Search
None
See application file for complete search history.

(56) References Cited

U.S. PATENT DOCUMENTS 5,272,017 A    12/1993    Swathirajan et al.
7,935,453 B2    5/2011    Beutel et al.
(Continued)

OTHER PUBLICATIONS

Strmcnik et al., Enhanced electrocatalysis of the oxygen reduction reaction based on patterning of platinum surfaces with cyanide, Nature Chemistry, Oct. 2010, pp. 880-885, vol. 2, Macmillan Publishers Limited.

(Continued)

*Primary Examiner* — Patrick Ryan
*Assistant Examiner* — Christopher Domone
(74) *Attorney, Agent, or Firm* — Dinsmore & Shohl LLP

(57) ABSTRACT

Fuel-cell assemblies containing a membrane electrode assembly, methods for preparing the membrane electrode assembly, and methods for functionalizing catalytic surfaces of catalyst particles in the membrane electrode assembly of the fuel cell assembly have been described. The fuel-cell assemblies and their membrane electrode assemblies contain cathode catalyst materials having catalytic surfaces that are functionalized with cyano groups to improve catalyst activity. The cathode catalyst materials may include a catalytic metal such as platinum or a platinum alloy. The cyano groups may be derived from a cyanide source that is electro-oxidized onto the catalytic surfaces. Nonlimiting examples of cyanide sources include amino acids such as glycine, alanine, and serine. The cyano groups may improve catalyst activity toward the oxygen-reduction reaction in a hydrogen fuel cell by blocking catalyst surface adsorption of contaminant species such as sulfates or sulfonates while allowing access of oxygen molecules to the catalyst surface.

12 Claims, 6 Drawing Sheets

(56) References Cited

U.S. PATENT DOCUMENTS

| | | |
|---|---|---|
| 2009/0186251 A1 | 7/2009 | Budinski |
| 2010/0159294 A1 | 6/2010 | Fly et al. |
| 2011/0171562 A1 | 7/2011 | Budinski et al. |

OTHER PUBLICATIONS

F. Huerta et al., Electrochemical behaviour of amino acids on Pt(h,k,l): a voltammetric and in situ FTIR study, Part 1. Glycineon Pt(111), Journal of Electroanalytical Chemistry 421, Jan. 30, 1997, pp. 179-185, Elsevier Science S.A.

R. Subbaraman et al., Three Phase Interfaces at Electrified Metal-Solid Electrollyte Systems 1. Study of the Pt (hkl)-Nafion Interface, J. Phys. Chem C 2010, pp. 8414-8422, 114, Apr. 6, 2010 American Chemical Society.

C. Stuhlmann et al., Scanning Tunneling Microscopy and Infrared Spectroscopy as Combined In-Situ Probes of Electrochemical Adlayer Structure: Cyanide on Pt(111), Office of Naval Research, Contract No. N00014-91-J-1409, Technical Report No. 147, Feb. 1994, Chemical Physics Letters.

MEMBRANE ELECTRODE ASSEMBLIES AND FUEL-CELL SYSTEMS WITH SURFACE-MODIFIED ELECTROCATALYSTS AND METHODS FOR ELECTROCATALYST SURFACE MODIFICATION

CROSS-REFERENCES TO RELATED APPLICATIONS

This application claims the benefit of priority under 35 U.S.C. §119(e) to U.S. Provisional Application Ser. No. 61/617,071, filed Mar. 29, 2012, which application is incorporated herein by reference in its entirety.

TECHNICAL FIELD

The present specification relates generally to fuel-cell catalysts and, more specifically, to membrane electrode assemblies and fuel-cell systems containing surface-modified electrocatalysts, and to methods for modifying the surfaces of the electrocatalysts.

BACKGROUND

Fuel cells convert a fuel into usable electricity via electrochemical reactions. A significant benefit to such an energy-producing means is that it is achieved without reliance upon combustion as an intermediate step. As such, fuel cells have several environmental advantages over internal combustion engines and related power-generating sources. In PEM fuel cells, which may include a proton exchange membrane or a polymer electrolyte membrane, for example, two catalytic electrodes are separated by an ion-transmissive medium (such as Nafion™) in what is commonly referred to as a membrane electrode assembly (MEA). The electrochemical reaction may involve oxidation of hydrogen molecules ($H_2$) at an anode to generate two protons ($H^+$) and two electrons and reduction of an oxidizing agent such as oxygen ($O_2$) at a cathode to form water. The protons generated at the anode may pass through the ion-transmissive medium to combine with the oxidizing agent, and the electrons generated at the anode may be diverted as direct current (DC) through an external electric circuit before being directed back to the cathode to participate in the reduction of the oxidizing agent. The external electric circuit typically includes a load where useful work may be performed. The power generation produced by this flow of DC electricity can be increased by combining numerous such cells to form a fuel cell stack.

The use of noble-metal catalysts can significantly add to the overall cost of a fuel cell system. More efficient dispersions of platinum and related catalyst materials has led to lower platinum loadings and related lower overall fuel cell system cost. Nevertheless, performance and durability issues become even more acute, as low platinum catalyst loading leads to a low overall reactive surface area that is more sensitive to surface contaminants that cause reversible performance loss. In addition, electrodes with low roughness factors, i.e., those with low ratios of active area to geometric area) have increased sensitivity to ionomer adsorption. Ionomer adsorption increases local resistance of oxygen transport to active catalyst sites because anions and organic molecules block surface sites on the platinum catalyst. Therefore, preventing the adsorptions both of anions and ionomers becomes imperative for enabling state-of-art electrodes with low platinum loading to function in systems such as automotive fuel cell systems. In the present context, durability is the ability of the platinum electrode to avoid or eliminate reversible voltage degradation, particularly the voltage degradation that may occur from adsorption of anions, ionomers, or both.

The oxygen reduction reaction (ORR) presents a challenge, because any suitable ORR catalyst must satisfy two competing objectives. First, the catalyst should minimize adsorption of spectator species that may poison the catalyst. Second, the catalyst must be sufficiently catalytically active to conduct oxygen reduction at potentials as close as possible to the roughly 1.2 V ORR reversible potential. Achieving both objectives is especially difficult when platinum loading is low.

Therefore, there remain ongoing needs for membrane electrode assemblies and fuel-cell systems having electrocatalysts that retain activity even with low levels of catalyst loading. There also remain ongoing needs for methods of preparing such membrane electrode assemblies and incorporating them into fuel-cell systems.

SUMMARY

Illustrative embodiments herein are directed to fuel-cell assemblies. The fuel-cell assemblies may include a membrane electrode assembly having an electrolyte membrane, a cathode layer disposed on a first side of the electrolyte membrane, and an anode layer disposed on a second side of the electrolyte membrane opposite the first side. The fuel-cell assemblies may also include an oxidant channel in fluidic communication with a cathode catalyst material in the cathode layer and a fuel channel in fluidic communication with an anode catalyst material in the anode layer. The fuel-cell assemblies may include an external electric circuit in electrical continuity with the anode layer and the cathode layer. In the fuel-cell assemblies according to embodiments herein, at least a portion of the cathode catalyst material comprises catalytic surfaces functionalized with cyano groups. In some embodiments, the cyano groups may be derived from electro-oxidation of a cyanide source at the cathode layer.

Further illustrative embodiments herein are directed to methods for preparing membrane electrode assemblies having functionalized cathode catalyst surfaces. The membrane electrode assemblies may be incorporated into a fuel-cell assembly having a cathode channel and an anode channel. In some embodiments, the methods may include applying electrodes to an electrolyte membrane to prepare the membrane electrode assembly. Applying the electrodes may include applying a catalytic ink to a first side of the electrolyte membrane to form a cathode layer on the first side of the electrolyte membrane. The catalytic ink may contain catalytic particles of a cathode catalyst material, electrically conductive particles, an ionomer binder, a cyanide source, and optionally a solvent. If present, the solvent may be removed from the catalytic ink when the cathode layer is formed. Applying the electrodes may further include applying an anode layer to a second side of the electrolyte membrane opposite the first side. The methods for preparing the membrane electrode assemblies having functionalized cathode catalyst surfaces may also include placing the cathode layer in fluidic communication with the cathode channel of the fuel-cell assembly and placing the anode layer in fluidic communication with the anode channel of the fuel-cell assembly. Once the membrane electrode assembly is assembled, the methods for preparing the membrane electrode assemblies further include cycling a cathode potential of the cathode layer relative to an anode potential of the anode layer. The cycling may be conducted from a minimum cathode potential to an electro-oxidation cathode potential at which the cyanide source is electro-oxidized and catalytic surfaces of the catalytic particles in the cathode layer become functionalized with cyano groups derived from the cyanide source. Once the electro-oxidation cathode potential is reached, the cathode potential may be cycled back to the minimum cathode potential.

Further illustrative embodiments herein are directed to methods for functionalizing catalytic surfaces of catalyst particles in a membrane electrode assembly of a fuel cell assembly. In such embodiments, the fuel-cell assembly includes a membrane electrode assembly having an electrolyte membrane, a cathode layer disposed on a first side of the electrolyte membrane, and an anode layer disposed on a second side of the electrolyte membrane opposite the first side. The membrane electrode assembly also includes a cathode channel in fluidic communication with cathode catalytic particles of a cathode catalyst material in the cathode layer, an anode channel in fluidic communication with anode catalytic particles of an anode catalyst material in the anode layer, and an external electric circuit in electrical continuity with the anode layer and the cathode layer. The methods for functionalizing the catalytic surfaces may include flowing a gas stream through the cathode channel, the gas stream comprising a carrier gas and a cyanide source while flowing a fuel through the anode channel. The methods further include cycling a cathode potential of the cathode layer relative to an anode potential of the anode layer. The cycling may be conducted from a minimum cathode potential to an electro-oxidation cathode potential at which the cyanide source is electro-oxidized and catalytic surfaces of the catalytic particles in the cathode layer become functionalized with cyano groups derived from the cyanide source. Once the electro-oxidation cathode potential is reached, the cathode potential may be cycled back to the minimum cathode potential.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
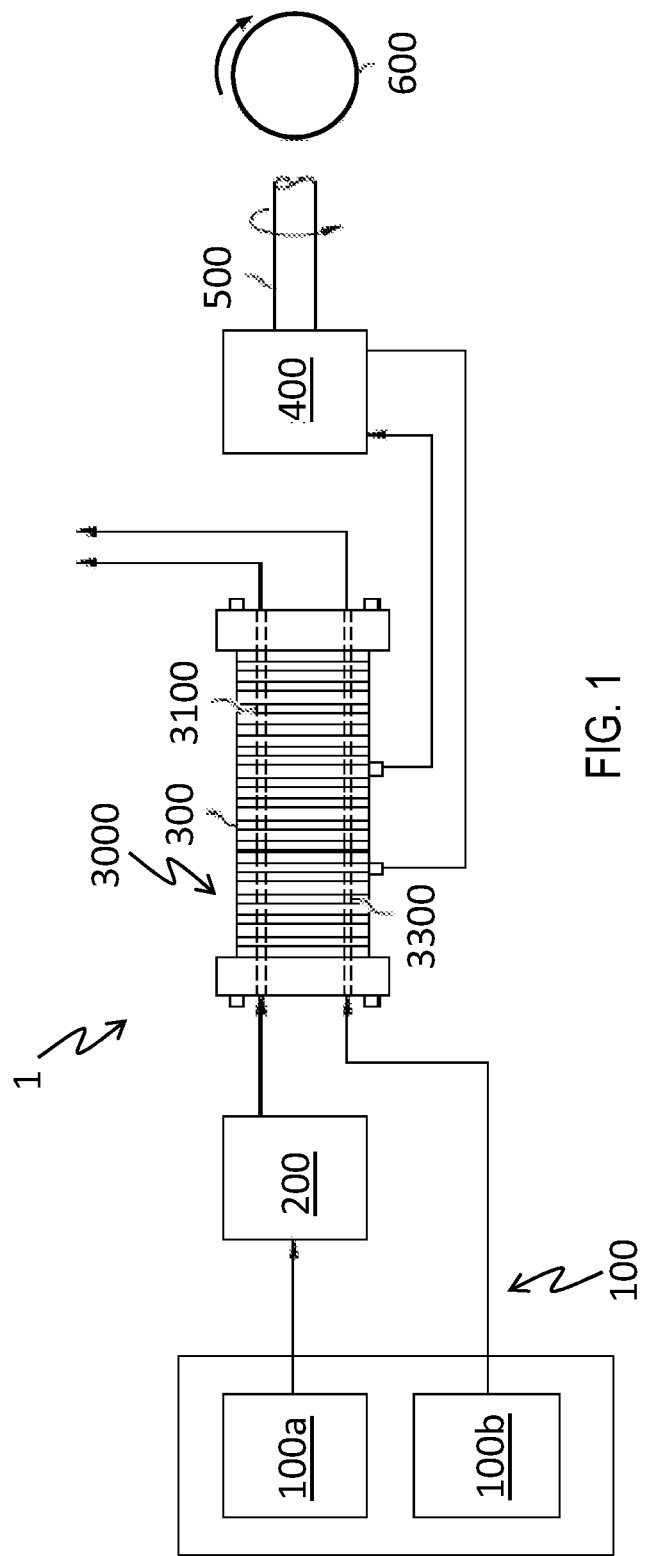
FIG. 1 schematically illustrates an exemplary fuel-cell system into which one or more fuel-cell assemblies according to embodiments herein may be incorporated.

Performance losses at current densities encountered in automotive fuel cell applications have been observed, particularly for low-Pt loaded electrodes. One possible reason for this performance loss is surface contamination by spectator species adsorption. One approach to promoting the oxygen-reduction reaction (ORR) according to embodiments herein involves the placement of adsorbates on the catalyst surface that block spectator anion adsorption while providing a sufficient number of available catalyst sites to facilitate oxygen reduction. For example, cyanide species ($CN^-$) may be particularly efficacious in forming an adsorption layer (adlayer) that is both stable and inert on a platinum surface. Thereby, adsorption of large anions such as sulfates or phosphates that are responsible for reversible degradations may be prevented while the electrochemical reduction of $O_2$ is promoted, because the $CN^-$ adlayers do not adversely impact the energetics of $Pt-O_2$ or Pt-intermediate bonds. In general, the use of $CN^-$ adlayers may be hampered by difficulties associated with their formation. Specifically, conventional $CN^-$ precursors such as cyanide salts are known to have high levels of toxicity, and are therefore undesirable for use in industrial applications. As such, embodiments herein may include forming $CN^-$ adlayers without use of toxic salts such as cyanides.

It is believed that the mass and specific activities of platinum supported on carbon catalyst decrease drastically when the platinum is exposed to sulfuric acid electrolyte solution or phosphoric acid solutions. This may be due to the specific adsorption of sulfate and phosphate anions on platinum catalyst surface, impeding the ORR. This effect in electrolyte solution may be analogous to observed decreases in platinum activity in fuel cell systems, particularly those including polymer electrolytic membranes. For example, during fuel cell system operation, anions such as sulfate can be either generated within the system as degradation products or introduced from fuel/air into the electrodes, leading to significant reversible voltage loss of the fuel cell system.

Additionally, performance loss at high current density for low-platinum-loading electrodes indicates that there may be additional local resistance related to the ORR. Compared with the performance of electrodes with 0.4 mg $Pt/cm^2$ loading, the performance of electrodes with 0.03 mg $Pt/cm^2$ loading drops significantly in the high current density region, which cannot be accounted for by considering the kinetic, proton transport and the known oxygen transport resistance through the diffusion medium (DM) and the bulk of the electrode. It is speculated that the additional loss may be due to some additional local resistance at the platinum-ionomer interface from an oxygen adsorption/reaction caused by the interaction of platinum with an ionomer containing sulfonic end groups and/or —$CF_2$ chain groups.

Embodiments of fuel-cell assemblies will now be described with reference to FIG. 1. Methods related to the fuel-cell assemblies will be described below. The fuel-cell assemblies may address the above-noted problems and may be incorporated into fuel-cell systems. The block diagram of FIG. 1 highlights the major components of a fuel-cell system 1 into which fuel-cell assemblies according to embodiments herein may be incorporated. The fuel-cell system 1 includes a fuel delivery system 100 (made up of fuel source 100a and oxygen source 100b), a fuel processing system 200, a fuel-cell assembly 300, an external electric circuit 400 that may include an energy storage device for example, a drivetrain 500, and one or more motive devices 600, shown notionally as a wheel. Though such a fuel-cell system 1 is shown for mobile (such as vehicular) applications, it should be appreciated by those skilled in the art that the use of the fuel-cell assembly 300 and its ancillary equipment may be equally applicable to stationary applications. It should also be appreciated by those skilled in the art that other fuel delivery and fuel processing systems are available. For example, there could be some variants where substantially purified fuel is already available, the fuel processing system 200 may not be required. In some embodiments the external electric circuit 400 may include one or more batteries, capacitors, electricity converters, or even a motor to convert the electric current coming from the fuel-cell assembly 300 into mechanical power such as rotating shaft power that can be used to operate the drivetrain 500 and one or more motive devices 600. The fuel processing system 200 may be incorporated to convert a raw fuel, such as methanol into hydrogen or hydrogen-rich fuel for use in the fuel-cell assembly 300; otherwise, in configurations where the fuel source 100a is already supplying substantially pure hydrogen, the fuel processing system 200 may not be required. An air delivery system may be disposed between the oxygen source 100b and the cathode of each fuel-cell assembly 300 and, as described below, is used to manipulate the flow of incoming air from oxygen source 100b.

Figure 2:
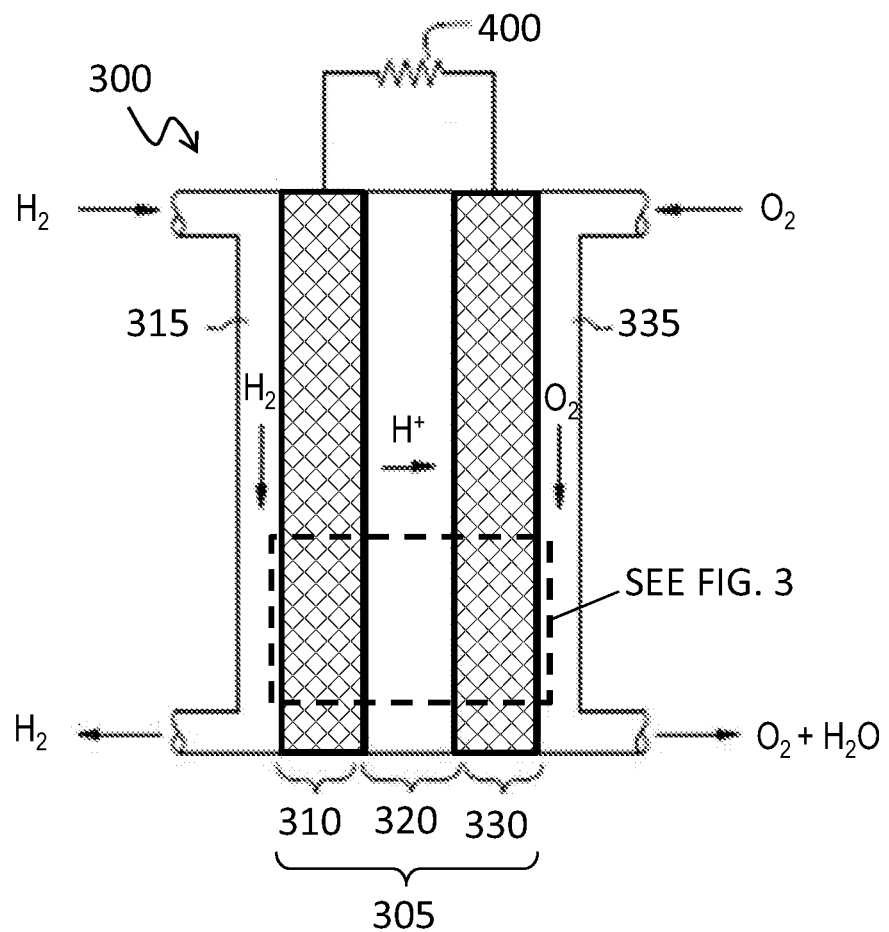
FIG. 2 schematically illustrates an exemplary fuel-cell assembly according to embodiments described herein.

Referring to FIGS. 1 and 2, each fuel-cell assembly 300 within stack 3000 includes an anode layer 310, a cathode layer 330, and an electrolyte membrane 320 disposed between the anode layer 310 and the cathode layer 330. The anode layer is in fluidic communication with an anode channel 315. The cathode layer 330 is in fluidic communication with a cathode channel 335. The anode channel 315 and the cathode channel 335 may form a part of an anode flowpath and cathode flowpath that act as conduit for delivering reactants to their respective anode and cathode. In a preferred (but not necessarily exclusive) embodiment, the reactant being routed through the anode channel 316 is hydrogen, while that being routed through the cathode channel 335 is air or related oxygen-rich fluid. In some embodiments, portions of the anode layer 310, the cathode layer 330, or both may be porous to allow diffusion of fuel and oxygen, as well as the flow of water that forms as a result of the fuel-oxygen reaction. The electrolyte membrane 320, shown in FIG. 2 in the form of a proton exchange membrane, may be placed between each of the anode layer 310 and the cathode layer 330 to allow ionized hydrogen to flow from the anode layer 310 to the cathode layer 330 while inhibiting the passage of electrical current therethrough.

A fuel such as hydrogen gas, for example, passes through the anode channel 315, allowing the fuel to diffuse through anode layer 310 and come in contact with catalyst, through which electrochemical oxidation of the hydrogen fuel proceeds by what is believed to be a dissociate adsorption reaction. The positively-charged hydrogen ion (proton) produced at the anode layer 310 then passes through the electrolyte membrane 320 to react with electrons and oxygen ($O_2$) molecules in the cathode layer 330. The flow of liberated electrons sets up a current through the external electric circuit 400 such that a motor or related current-responsive device may be turned. The external electric circuit 400, shown in FIGS. 1 and 2 in the form of the previously-discussed energy storage device, completes an electrical flow path between the anode layer 310 and the cathode layer 330 of the fuel-cell assembly 300. An additional pump (not shown) may be included to remove water that would otherwise collect and possibly block porous passageways present within the fuel-cell assembly 300.

Figure 3:
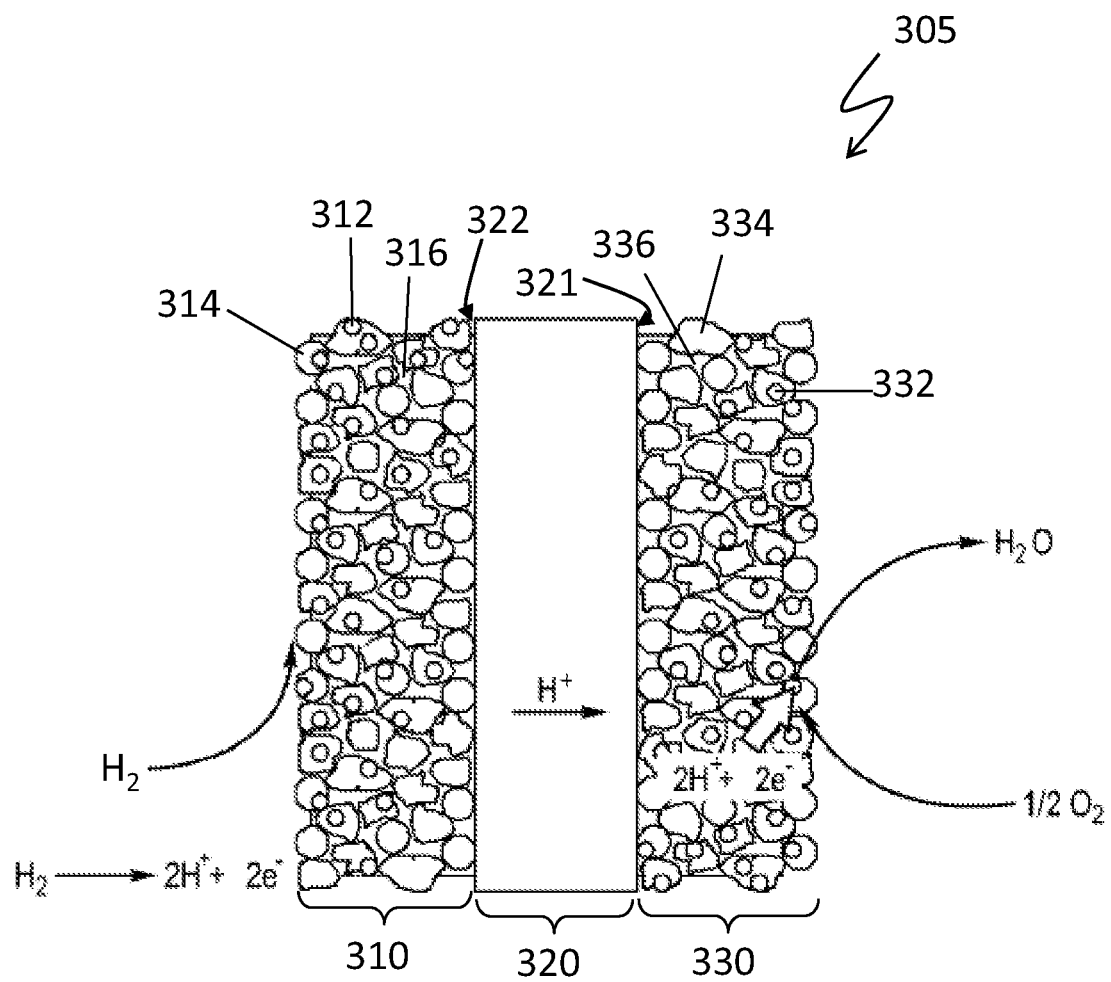
FIG. 3 is a detail view of the fuel-cell assembly of FIG. 2, in which the membrane electrode assembly and electrode layers with catalyst materials, conductive particles, and ionomer binder are shown.

Referring to FIGS. 2 and 3, according to some embodiments, a fuel-cell assembly may include a membrane electrode assembly 305. The membrane electrode assembly 305 may include an electrolyte membrane 320, a cathode layer 330 disposed on a first side 321 of the electrolyte membrane 320, and an anode layer 310 disposed on a second side 322 of the electrolyte membrane 320 opposite the first side 321. The fuel-cell assembly 300 may also include a cathode channel 335 in fluidic communication with cathode catalyst particles 332 of a cathode catalyst material in the cathode layer 330. The fuel-cell assembly 300 may also include an anode channel 315 in fluidic communication with an anode catalytic particles 312 of an anode catalyst material in the anode layer 310. An external electric circuit 400 may be connected to the fuel-cell assembly 300 in electrical continuity with the anode layer 310 and the cathode layer 330. At least a portion of the cathode catalyst particles 332 comprise catalytic surfaces functionalized with cyano groups, described in greater detail below. In some embodiments, the cyano groups may be added to the catalytic surfaces of the cathode catalyst particles 332 following embodiments of methods also described in detail below.

Referring to FIG. 3, the membrane electrode assembly 305 includes the electrolyte membrane 320 sandwiched between the anode layer 310 and the cathode layer 330. The anode layer 310 represents an anode where a fuel gas such as hydrogen is electrochemically oxidized into proton ions by surrendering two electrons. The protons are transported through the electrolyte membrane 320 to the cathode layer 330. Oxygen (or air) diffuses into the cathode layer 330 to combine with protons through an electrochemical reduction reaction that generates water as a product. The water generated on the cathode layer 330 is typically carried away by the gas flow over the cathode surface. Electricity is generated in the electrochemical processes where electrons are produced in the anode layer 310 and consumed in the cathode layer 330.

In some embodiments, the electrolyte membrane 320 may be an ion exchange resin membrane. The resins of the ion exchange membrane include ionic groups in their polymeric structure; one ionic component of which being fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins may be prepared by polymerizing a mixture of ingredients, one of which contains an ionic constituent. One broad class of cation exchange, proton conductive resins includes sulfonated polymer cation exchange resins. In sulfonated polymer membranes, the cation ion exchange groups are hydrated sulfonic acid radicals that are covalently attached to a polymer backbone.

The formation of these ion exchange resins into membranes or sheets is well known in the art. The preferred type is a sulfonated fluoropolymer electrolyte in which the entire membrane structure has ion exchange characteristics and the polymer has a fluorinated backbone structure. These membranes are commercially available, and a typical example of a commercial sulfonated fluorinated, proton conductive membrane is sold by E.I. Dupont de Nemours & Co. under the trade designation NAFION. Another such sulfonated fluorinated ion exchange resin is sold by Dow Chemical.

The anode layer 310 and the cathode layer 330 in the membrane electrode assembly 305 may be different or the same in their compositions and thickness. In some embodiments both the anode layer 310 and the cathode layer 330 may comprise a catalyst, an electrically conductive particulate material and an ionomer binder. For example, the anode layer 310 may include anode catalyst particles 312 loaded onto anode conductive particles 314, and the catalyst-loaded particles may be bound within an anode ionomer 316. Likewise, the cathode layer 330 may include cathode catalyst particles 332 loaded onto cathode conductive particles 334, and the catalyst-loaded particles may be bound within a cathode ionomer 336. In some embodiments, only the cathode layer 330 includes the catalyst-loaded particles and ionomer binder, and the anode layer 310 is any form of fuel-cell anode layer known in the art. Ionomer binders provide an ion exchange function similar to the function provided by the electrolyte membrane 320. Ionomer binders also bind the catalyst material and the electrically conductive particulate materials together and provide strong bonding between the electrode layers 310, 330 and the electrolyte membrane 320. The anode catalyst material is capable of catalyzing the electrochemical oxidation of fuel gases such as hydrogen, carbon monoxide and methanol. The cathode catalyst material is capable of catalyzing the electrochemical reduction of oxidant gases such as oxygen. Electrically conductive particulate materials provide electric conductivity for the electrode layers 310, 330 and may also function as a catalyst support.

The anode catalyst material and the cathode catalyst material may be the same or different. Suitable materials for one or both of the anode catalyst material and the cathode catalyst material may include supported metal catalysts such as platinum or a platinum alloy, with carbon as the electrically conductive particles 314, 334. The carbon support preferably has a specific surface area of from 50 $m^2/g$ BET to 2000 $m^2/g$ BET surface area. Within this range, the metal catalyst is supported on the carbon support with good dispersibility and stability, exhibiting a superior activity in the electrochemical reactions for a long time. In one embodiment, platinum is used because it is highly active with respect to the hydrogen oxidation reaction at the anode layer 310 and the oxygen reduction reaction at the cathode layer 330 in such a MEA fuel cell. A platinum alloy may also be used to impart the electrode catalyst with further stability and activity.

In some embodiments, the aforementioned platinum alloy is preferably an alloy comprising platinum and one or more metals selected from the group consisting of platinum group metals other than platinum (ruthenium, rhodium, palladium, osmium, iridium), gold, silver, chrome, iron, titanium, manganese, cobalt, nickel, molybdenum, tungsten, aluminum, silicon, zinc, tin, and combinations thereof. The catalyst materials may also include an intermetallic compound of platinum and a metal alloyed with platinum. Particularly in the case where the anode is supplied with a gas containing carbon monoxide, the use of an alloy comprising platinum and ruthenium in the anode is preferable because the activity of the catalyst is stabilized. In some embodiments, the cathode catalyst material may be any material that can be surface-functionalized with cyano groups. Suitable materials in this regard include the abovementioned platinum alloys, palladium or palladium alloys, and gold or gold alloys, for example.

The electrically conductive particulate material of the cathode conductive particles 334 or the anode conductive particles 314 may comprise any inert conductive material with relatively high surface area. In one embodiment, a particulate carbon having a BET surface area of about 50 $m^2/g$ to about 2000 $m^2/g$ may be used. The particulate carbon may have a particle size in the range of about 0.002 µm to about 100 µm. In another embodiment, carbon particulate materials having a particle size of from about 0.02 µm to about 1 µm and a BET surface area of from 100 $m^2/g$ to 1000 $m^2/g$ may be used. Non-limiting examples of particulate carbons include Vulcan XC-72R (available from Cabot Corporation), Ketjen black (available from Noury Chemical Corporation), carbon nanotube, and acetylene black.

An ionomer binder for the anode ionomer 316, the cathode ionomer 336, or both may be selected from any ion exchange materials capable of binding particulate materials and possessing sufficient ion exchange capacity to sustain the electrochemical reactions on and within the respective electrode layers. In an illustrative embodiment, the ionomer binder may be a polymer resin having ion exchange moieties such as carboxylate or sulfonate group in the molecular structure of the polymer. In another embodiment, the ionomer binder may be an ion exchange resin similar to what is used in electrolyte membrane 320 as described above. The ionomer binders may comprise a mixture of an ion exchange resin and a binder resin to provide the desired binding and ion exchange properties. The ionomer binders may be soluble or dispersible in a volatile solvent such as water and organic solvents. The ionomer binders may be softened to exhibit viscous adhesive characteristic at elevated temperatures to facilitate good bonding to the electrolyte membrane 320 in a hot press lamination process. Non-limiting examples of ionomer binder include sulfonated fluoropolymers in solutions such as Nafion Solution (available from Solution Technologies), and its mixture with a polytetrafluoroethylene dispersion.

The ion-exchange capacity of the electrolyte membrane 320 and that of the ionomer binder resin contained in the anode layer 310 and/or the cathode layer 330 are each preferably from 0.5 to 4.0 milliequivalent(meq)/g dry resin, particularly preferably from 0.7 to 2.0 meq/g dry resin.

A solvent ink may be used to make the anode layer 310 and the cathode layer 330. Such a solvent ink may contain a volatile solvent, the catalyst material, the electrically conductive particulate material, and the ionomer binder. Each of the catalyst material, the electrically conductive particulate material, and the ionomer binder is fully described above. A single volatile solvent or a solvent mixture may be used to produce the ink, namely, a solution or a slurry containing the catalyst material, the electrically conductive particulate material, and the ionomer binder. Other optional components such as humectants, water repellents, surfactants, polymer additives, and other stabilization agents may also be included in the ink.

Suitable volatile solvents for use in the solvent ink include, but are not limited to, alcohols, water, and fluorine-containing solvents. Alcohols may include short chain alcohols such as methyl alcohol, ethyl alcohol, n-propyl alcohol, isopropyl alcohol, tert-butyl alcohol and the like. Mixing an alcohol with water makes it possible to enhance the solubility of an ionomer binder resin. Fluorine-containing solvents may include (i) hydrofluorocarbons such as 2H-perfluoropropane, 1H,4H-perfluorobutane, 2H,3H-perfluoropentane, 3H,4H- perfluoro(2-methylpentane), 2H,5H-perfluorohexane, and 3H-perfluoro(2-methylpentane); (ii) fluorocarbons such as perfluoro(1,2-dimethylcyclobutane), perfluorooctane, perfluoroheptane, and perfluorohexane; (iii) hydrochlorofluorocarbons such as 1,1-dichloro-1-fluoroethane, 1,1,1-trifluoro-2,2-dichloroethane, 3,3-dichloro-1,1,1,2,2-pentafluoropropane, and 1,3-dichloro-1,1,2,2,3-pentafluoropropane; (iv) fluoroethers such as 1H,4H,4H-perfluoro(3-oxapentane) and 3-methoxy-1,1,1,2,3,3-hexafluoropropane; and (v) fluorine-contained alcohols such as 2,2,2-trifluoroethanol, 2,2,3,3,3-pentafluoro-1-propanol, and 1,1,1,3,3,3-hexafluoro-2-propanol.

In the case where the solvent ink contains a fluorine-free ion exchange resin, N,N-dimethylformamide (DMF), dimethyl sulfoxide (DMSO), methylene chloride, chloroform, carbon tetrachloride, 1,1,1-trichloroethane, 1,1,2-trichloroethane, trichloroethylene, and tetrachloroethylene may also be used.

The solvent ink may contain about 0.1%-10% by weight ionomer binder, about 0.1%-60% by weight electrically conductive particulate material, and 0.001%-12% by weight catalyst. The total solid content of the ink may range from 0.2% to about 60% by weight. The ink can be made by simple mechanical mixing, high speed shear mixing, milling, or ultrasonication of the ink components. Any other ink making methods known to one of ordinary skill in the art may also be used.

Fuel cells can be made by stacking multiple membrane electrode assemblies prepared as described above with bipolar plates having gas flow channels in an alternating manner. Any configurations and methods known to one of ordinary skill in the art can be used to construct fuel cells using the MEA described above. One illustrative example for constructing a fuel cell from a MEA can be found in a commonly owned U.S. Pat. No. 5,272,017, incorporated herein by reference.

For sake of simplicity only, the embodiments of membrane electrode assemblies herein have been described in the context of single electrochemical cell configurations. Nevertheless, it should be understood that the membrane electrode assemblies described herein may be incorporated into larger fuel-cell assemblies that may include stacks of tens or hundreds of individual fuel cells. For example, in some embodiments, the membrane electrode assemblies having cyano-functionalized cathode catalyst surfaces and described herein may be incorporated into stacked fuel cells or fuel-cell assemblies such as those depicted and described in commonly-assigned U.S. Pat. No. 7,935,453 and U.S. Pat. Appl. Pub. Nos. 2010/0159294 and 2011/0171562, each of which documents is incorporated herein by reference. In such embodiments, a membrane electrode assembly as described herein may be interposed between two gas diffusion layers. The combination of the membrane electrode assembly may be interposed between two bipolar plates. Each bipolar plate may be shared with a neighboring fuel cell that itself includes a membrane electrode assembly interposed between two gas diffusion layers. A stack of fuel cells thus formed may be interposed between unipolar plates and capped with end caps. Individual plates of such fuel-cell stacks may include flow channels for oxidant, fuel, and cooling media that run perpendicular to the direction of the fuel-cell stack.

Fuel cells made from the membrane electrode assemblies according to embodiments herein may have many different practical uses. The fuel cells are particularly suitable as energy devices for power tools, vehicle engines, electric power plants, emergency electricity supply, portable electronics and the like. Purified hydrogen and air may be used as the fuel gas and oxidant gas, respectively, in the fuel cell.

As noted above, according to some embodiments the membrane electrode assembly 305 of the fuel-cell assembly 300 includes a cathode layer 330 at which oxygen reduction occurs during operation of the fuel-cell assembly 300. The cathode layer 330 may include the cathode catalyst particles 332 supported on the cathode conductive particles 334, the cathode conductive particles 334 being bound by the cathode ionomer 336 or dispersed in the cathode ionomer 336. At least a portion of a catalytic surface 338 of the cathode catalyst particles 332 is functionalized with cyano groups. Referring to FIGS. 3-6, the structure and function of the cathode catalyst material according to these embodiments will now be described.

Figure 4:
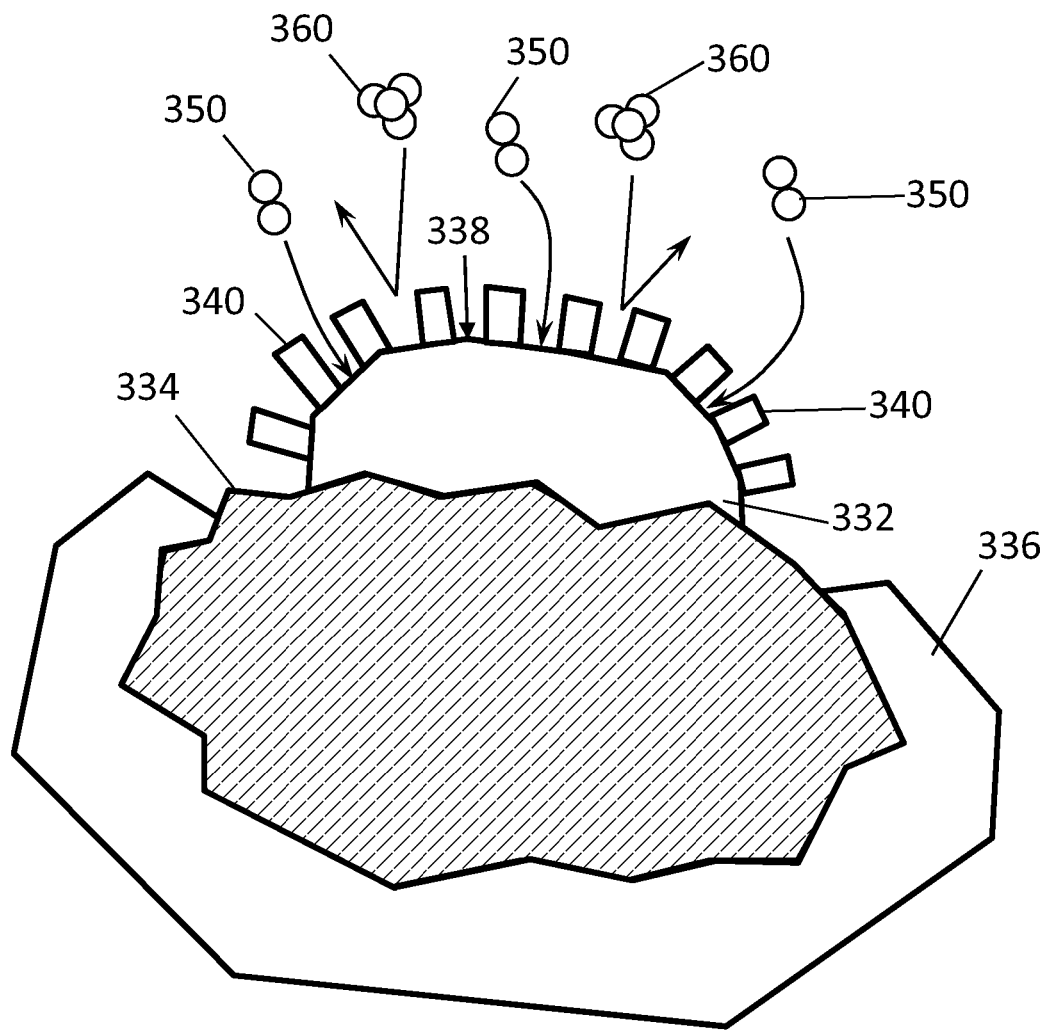
FIG. 4 is a close-up view of a catalyst particle loaded onto a conductive particle in an ionomer binder, in which catalytic surfaces of the catalyst particle are functionalized with cyano groups.

A schematic diagram of a catalytic portion of the cathode layer 330 is provided in FIG. 4. The cathode catalyst particles 332 may be supported on a cathode conductive particle 334. Cathode ionomer 336 binds to at least a portion of the cathode conductive particle 334 while leaving a catalytic surface 338 of the cathode catalyst particles 332 exposed and open for acceptance of oxygen molecules 350 to be reduced. At least a portion of the catalytic surface 338 of the cathode catalyst particles 332 is functionalized with cyano groups 340. Without intent to be bound by theory, it is believed that the functionalization of the catalytic surface 338 with the cyano groups 340 may permit space between the cyano groups 340 sufficient to allow the oxygen molecules 350 to reach the catalytic surface 338 between the cyano groups 340. Yet, it is believed that even though the oxygen molecules 350 can reach the catalytic surface 338, the spaces between the cyano groups 340 may be sufficiently small to prevent contaminant species 360 such as sulfate ions, phosphate ions, sulfonate groups, or other large molecules or ions from reaching and/or binding to the catalytic surface 338, thereby potentially decreasing the activity of the fuel-cell assembly 300. Such contaminant species 360 are typically present during fuel cell operation and may result from decomposition or degradation of components of the membrane electrode assembly 305 or from general pollution present in the oxidant stream.

Figure 5A:
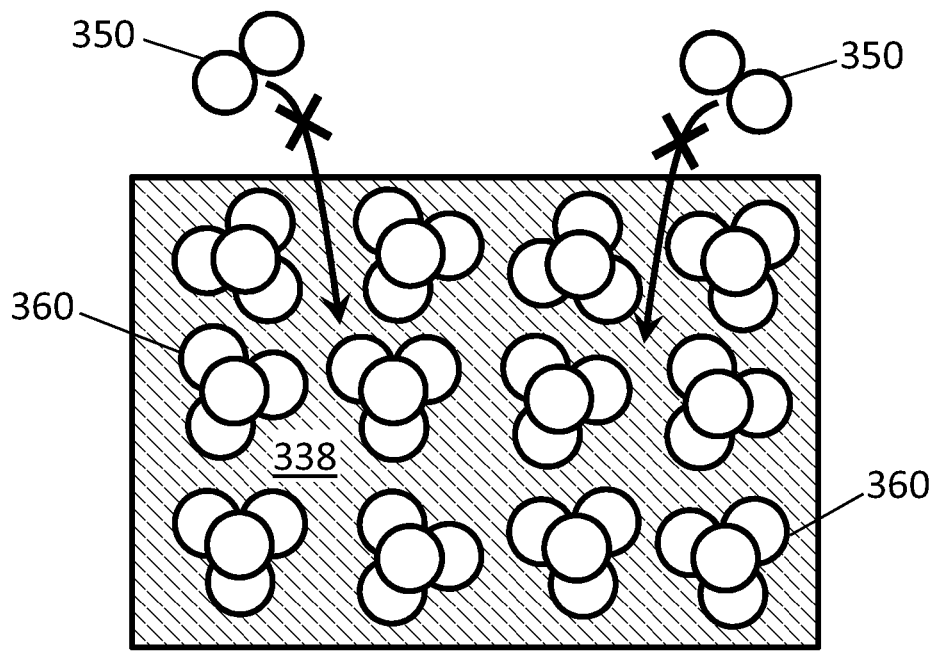
FIG. 5A is a schematic representation of contaminant species absorbed onto a catalyst surface and preventing access of oxygen molecules to the catalyst surface.
Figure 5B:
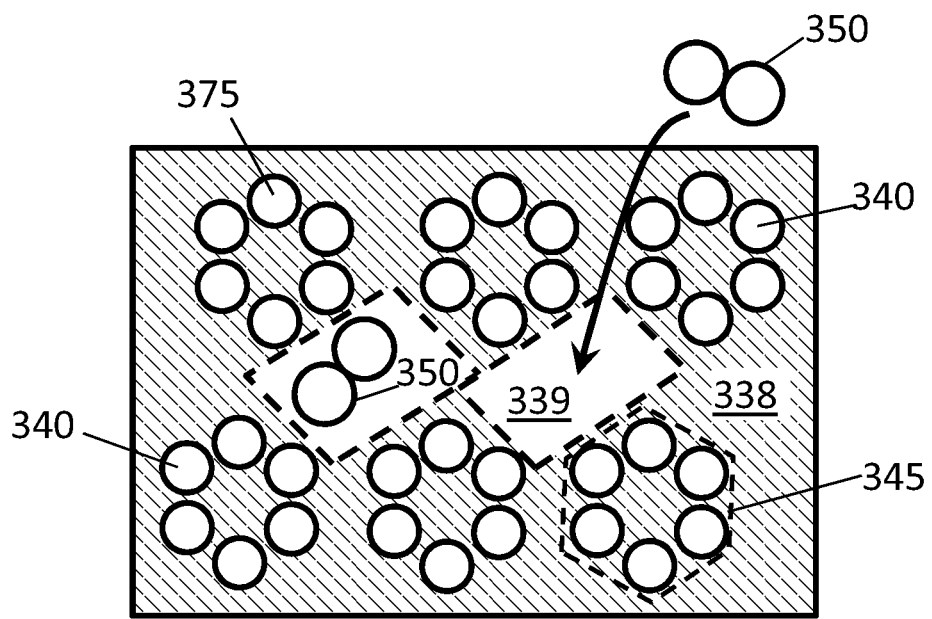
FIG. 5B is a schematic representation of a catalyst surface functionalized with cyano groups according to embodiments herein, through which access of oxygen molecules to the catalyst surface is facilitated but access of contaminant molecules or ions to the same surface is diminished or prevented.

Further illustration of the deleterious effects of contaminant species 360 is provided schematically in FIGS. 5A and 5B. In FIG. 5A, the catalytic surface 338 is shown having with contaminant species 360 adsorbed thereon. Such an arrangement may occur readily when the concentration of the contaminant species 360 in the oxidant stream is sufficiently high. The contaminant species arrange themselves such that decreased space on the catalytic surface 338 is available for the oxygen molecules 350 to reach the catalytic surface 338 to be reduced. Though as shown in FIG. 5A, none of the oxygen molecules 350 are able to reach the catalytic surface 338, it is contemplated that, in practice, adsorption of the contaminant species 360 may occur at a level that does not block access of all the oxygen molecules 350 to the catalytic surface 338 but indeed blocks assess of a small or large portion of the oxygen molecules 350 to the catalytic surface 338. Regardless, any blocking of oxygen molecules 350 to the catalytic surface 338 by the contaminant species 360 may reduce the activity of the oxygen reduction reaction and, thereby, may also reduce the energy output of the fuel-cell assembly 300.

In contrast, as shown in FIG. 5B, it is believed that cyano groups 340 functionalized onto the catalytic surface 338 may naturally arrange themselves in a manner that permits the oxygen molecules 350 to reach a greater portion of the surface area of the catalytic surface 338 than would occur if the catalytic surface 338 were poisoned by contaminant species 360 as shown in FIG. 5A. For example, the arrangement of the cyano groups 340 is believed to be configured into hexagonal clusters 345, particularly when the cathode catalyst material is platinum or a platinum alloy. The hexagonal clusters 345 leave between each other a plurality of active zones 339 large enough to allow the oxygen molecules 350 to reach the catalytic surface 338. But additionally, the active zones 339 that naturally form are too small to provide space for the contaminant species 360 to reach and/or bind to the catalytic surface 338. As such, it is believed that the cyano group 340 surface functionalization may increase the activity and/or output of the oxygen reduction reaction and the fuel-cell assembly 300.

Figure 6:
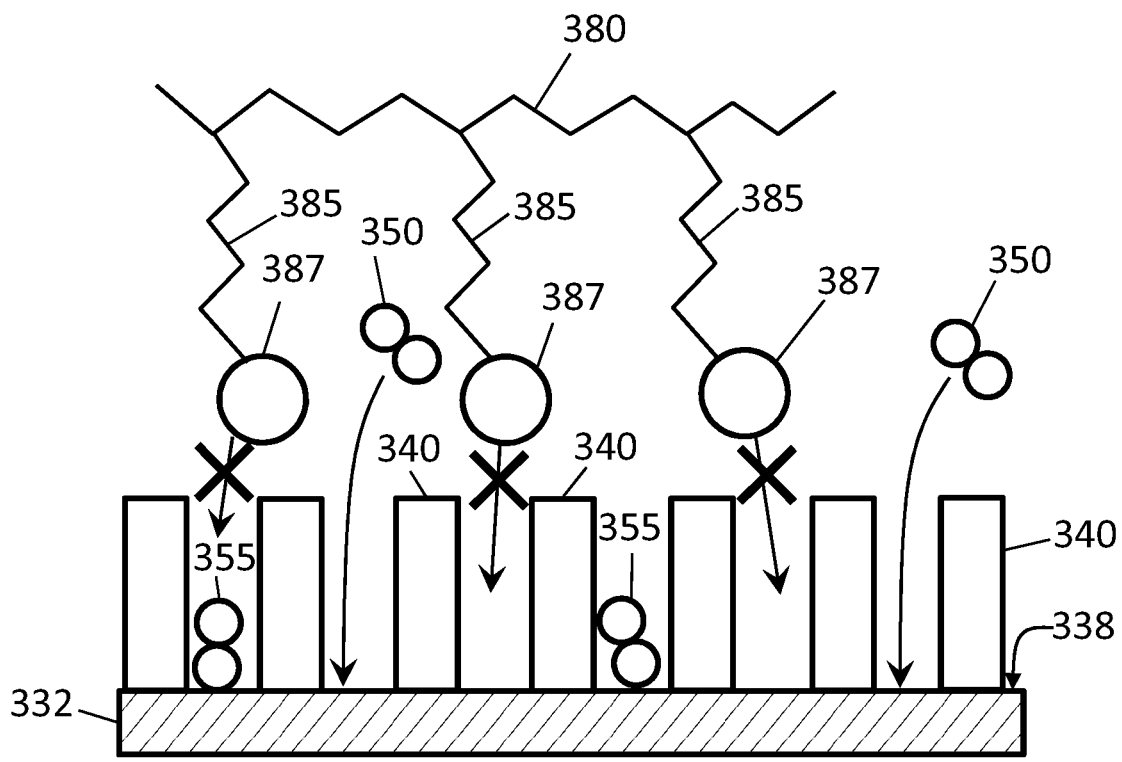
FIG. 6 is a schematic representation of a catalyst surface functionalized with cyano groups according to embodiments herein, through which access of oxygen molecules to the catalyst surface is facilitated but access of bulky ionic groups on an ionomer molecule to the same surface is diminished or prevented.

The effect of functionalization of the catalytic surface 338 of the cathode catalyst particles 332 is further illustrated schematically in FIG. 6. Between the cyano groups 340, space is sufficient for oxygen molecules 350 to reach the catalytic surface 338 and become adsorbed oxygen molecules 355 able to be reduced. Whereas FIGS. 5A and 5B illustrate the effect of the cyano groups 340 on the contaminant species 360, FIG. 6 further shows how the cyano groups 340 inhibit adsorption of bulky anion 387 end groups of an ionomer molecule 380. Ionomer molecules in general are known to have a strong affinity for binding to catalyst surfaces and reducing catalytic activity. In the illustration of FIG. 6, the ionomer molecule 380 includes side chains 385 that end with a bulky anion 387. In some embodiments, in which the cathode ionomer 336 is a sulfonated fluoropolymer, for example, the bulky anion 387 may be a sulfonate group. The cyano groups 340 are arranged on the catalytic surface 338 such that they provide a steric hindrance to the bulky anion 387 portion of the ionomer molecule 380 that prevents the ionomer molecule 380 from contacting or binding to the catalytic surface 338.

According to some embodiments, at least a portion of the cyano groups 340 on the catalytic surface 338 of the cathode catalyst particles 332 in the cathode layer 330 may be derived from electro-oxidation of an amino acid on the catalytic surface. In some embodiments, the amino acid may be selected from the group consisting of glycine, alanine, serine, and mixtures thereof. In some embodiments, the amino acid is glycine. Functionalization of the catalytic surface 338 with cyano groups 340 by electro-oxidation of an amino acid will be described below in greater detail with reference to various embodiments of methods for preparing the membrane electrode assembly 305 and methods for functionalizing catalytic surfaces of catalyst particles in a membrane electrode assembly of a fuel cell assembly.

Methods with regard to preparing and/or maintaining the membrane electrode assemblies and/or the fuel-cell assemblies described above will now be provided. First, methods for preparing a membrane electrode assembly will be described. In some embodiments, the methods for preparing the membrane electrode assembly are conducted during the manufacturing of the membrane electrode assembly or during construction of the fuel-cell assembly. In such methods, the cyanide source is included in a catalyst ink used to form the electrode layers, and subsequent electrochemical cycling causes the cyanide source to form cyano groups on the catalytic surfaces of the cathode catalyst material. Second, methods for functionalizing catalytic surfaces of catalyst particles in a membrane electrode assembly of a fuel cell assembly will be described. In some embodiments, the methods for functionalizing catalytic surfaces of catalyst particles in a membrane electrode assembly of a fuel cell assembly are conducted also during the construction of the fuel-cell assembly. In such methods, a gas containing the cyanide source is introduced into the cathode channel of the constructed fuel-cell assembly, and functionalization of the catalytic surfaces occurs via subsequent electrochemical voltage cycling. As such, the methods for functionalizing catalytic surfaces of catalyst particles in a membrane electrode assembly of a fuel cell assembly also may be conducted as a maintenance operation to improve the activity of a fuel cell assembly after many months or years, for example, in the event that all or a portion of the cyano groups on the cathode catalyst happens to desorb or decompose after time.

Exemplary embodiments of methods for preparing a membrane electrode assembly according to one or more of the embodiments above will now be described. Referring to FIGS. 2-4, the membrane electrode assemblies 305 prepared according to such embodiments have catalytic surfaces 338 functionalized with cyano-groups 340 on cathode catalyst particles and are incorporated into a fuel-cell assembly 300 having a cathode channel 335 and an anode channel 315. The preparation methods may include applying electrode layers 310, 330 to an electrolyte membrane 320 to prepare the membrane electrode assembly 305; placing the cathode layer 330 in fluidic communication with the cathode channel 335 of the fuel-cell assembly 300; placing the anode layer 310 in fluidic communication with the anode channel 315 of the fuel-cell assembly 300; and cycling a cathode potential of the cathode layer 330 relative to an anode potential of the anode layer 310 from a minimum cathode potential, to an electro-oxidation cathode potential at which the amino acid is electro-oxidized and catalytic surfaces of the catalytic particles in the cathode layer 330 become functionalized with cyano groups 340 derived from the amino acid, and back to the minimum cathode potential.

In some embodiments of the preparation methods for the membrane electrode assembly 305, applying the electrode layers 310, 330 may include applying a catalytic ink to a first side 321 of the electrolyte membrane 320. The catalytic ink may contain catalytic particles of a cathode catalyst material, electrically conductive particles, an ionomer binder, a cyanide source, and typically a solvent. The cathode catalyst material, the electrically conductive particles, the ionomer binder, the catalytic ink, the solvent, and the electrolyte membrane are described above. The catalytic ink may be applied to the first side 321 of the electrolyte membrane 320 using any general application method known in the art to form the cathode layer 330. In some embodiments, for example, the catalyst ink is applied directly to the first side 321 of the electrolyte membrane 320 and the solvent is removed. In other embodiments, the catalyst ink is applied first to an article such as a decal or a gas diffusion media, and then the catalyst ink is applied to the first side 321 of the electrolyte membrane 230 by contacting the article to the first side 321.

In further embodiments of the preparation methods for the membrane electrode assembly 305, applying the electrode layers 310, 330 may include applying a catalytic ink to a dispensable decal (not shown) according to known methods, then applying the dispensable decal with the catalytic ink thereon to a first side 321 of the electrolyte membrane 320. The catalytic ink may contain catalytic particles of a cathode catalyst material, electrically conductive particles, an ionomer binder, a cyanide source, and a solvent. The cathode catalyst material, the electrically conductive particles, the ionomer binder, the catalytic ink, the solvent, and the electrolyte membrane are described above. The catalytic ink may be applied to the first side 321 of the electrolyte membrane 320 using any general application method known in the art form the cathode layer 330.

In further embodiments of the preparation methods for the membrane electrode assembly 305, applying the electrode layers 310, 330 may include applying a catalytic ink to a surface of a gas diffusion layer (not shown) intended to be used in the fuel-cell assembly with according to known methods, then applying the surface of the gas diffusion layer against a first side 321 of the electrolyte membrane 320 and subsequently hot pressing the gas diffusion layer and the membrane electrode assembly 305 according to known methods. The catalytic ink may contain catalytic particles of a cathode catalyst material, electrically conductive particles, an ionomer binder, a cyanide source, and a solvent. The cathode catalyst material, the electrically conductive particles, the ionomer binder, the catalytic ink, the solvent, and the electrolyte membrane are described above. The catalytic ink may be applied to the first side 321 of the electrolyte membrane 320 using any general application method known in the art form the cathode layer 330.

In some embodiments, the cyanide source may be acetonitrile, hydrogen cyanide, or a cyanide salt such as sodium cyanide or potassium cyanide. In preferred embodiments, the cyanide source may be an amino acid, particularly any amino acid that forms cyanide ions during electro-oxidation of the amino acid. In exemplary embodiments, the cyanide source may be an amino acid selected from the group consisting of glycine, alanine, serine, threonine, valine, leucine, isoleucine, aspartic acid, and glutamic acid. The chemical structures of these amino acids are shown in TABLE.

TABLE 1

| Amino Acid | Structure |
|---|---|
| Glycine | H₂N-CH(H)-COOH |
| Alanine | H₂N-CH(CH₃)-COOH |
| Serine | H₂N-CH(CH₂OH)-COOH |
| Threonine | H₂N-CH(CH(OH)CH₃)-COOH |
| Valine | H₂N-CH(CH(CH₃)₂)-COOH |
| Leucine | H₂N-CH(CH₂CH(CH₃)₂)-COOH |
| Isoleucine | H₂N-CH(CH(CH₃)CH₂CH₃)-COOH |

TABLE 1-continued

| Amino Acid | Structure |
|---|---|
| Aspartic Acid | H₂N-CH(CH₂COOH)-COOH |
| Glutamic Acid | H₂N-CH(CH₂CH₂COOH)-COOH |

In especially preferred embodiments, the cyanide source is an amino acid selected from the group consisting of glycine, alanine, serine, and mixtures thereof. In other preferred embodiments, the amino acid may comprise glycine or consist of glycine. In some embodiments, the amino acid is added to the catalyst ink in any amount sufficient to result in functionalization of the catalytic surfaces 338 in the cathode layer 330 with cyano groups 340 after the electro-oxidation step described below.

Once the catalytic ink has been applied to the electrolyte membrane 320, any solvent in the catalytic ink may be removed to form the cathode layer 330 on the first side 321 of the electrolyte membrane 320. The solvent may be removed by any suitable process such as evaporation, with or without application of heat and/or vacuum.

The preparation methods for the membrane electrode assembly further include applying an anode layer 310 to a second side 322 of the electrolyte membrane 320 opposite the first side 321. The anode layer 310 may be applied before the cathode layer 330 is applied, after the cathode layer 330 is applied, or at the same time as the cathode layer 330 is applied. In some embodiments, the anode layer 310 may be applied by a process similar to the application of the cathode layer 330, in which the anode layer 310 is formed from a catalyst ink containing an anode catalyst material, electrically conductive particles, an ionomer binder, and a solvent. In such embodiments, the catalyst ink for preparing the anode layer 310 may contain a cyanide source (for example, the amino acid) but need not contain a cyanide source. In embodiments in which the ink for preparing the anode layer 310 does not contain a cyanide source, only the cathode layer 330 of the resulting membrane electrode assembly may contain cyanide-functionalized catalysts. In some embodiments, the anode layer 310 may be formed by any process known to those skilled in the art, not limited to application by use of a catalyst ink. According to embodiments herein, in general, the cathode layer 330 and the anode layer 310 are provided such that the cyanide source or amino acid is present in the cathode layer 330 and cyanide source or amino acid may or may not be present in the anode layer 310.

Once the cathode layer 330 and the anode layer 310 have been applied to the electrolyte membrane 320, the preparation methods for the membrane electrode assembly 305 further include placing the cathode layer 330 in fluidic communication with the cathode channel 335 of the fuel-cell assembly 300 and placing the anode layer 310 in fluidic communication with the anode channel 315 of the fuel-cell assembly 300. Placing the cathode layer 330 and the anode layer 310 in fluidic communication with a respective channel may be accomplished by any practical process and in any order or simultaneously. In general, the placing of the cathode layer 330 and the anode layer 310 is a routine step of assembling of the fuel-cell assembly 300. In some embodiments, the placing of the cathode layer 330 and the anode layer 310 includes inserting the membrane electrode assembly 305 into a pre-existing framework of the fuel-cell assembly 300. In other embodiments, the placing of the cathode layer 330 and the anode layer 310 includes stacking the membrane electrode assembly 305 between layers of a stacked fuel-cell assembly that may include numerous fuel cells configured as parallel plates such as bipolar plates or diffusion media. Once the cathode layer 330 and the anode layer 310 are placed into fluidic communication with respective channels of the fuel-cell assembly 300, the fuel-cell assembly 300 may be operated to generate electricity by introducing a fuel into the anode channel 315 and introducing an oxidant into the cathode channel 335.

Once the cathode layer 330 has been placed in fluidic communication with the cathode channel 335 and the anode layer 310 has been placed in fluidic communication with the anode channel 315, the preparation methods for the membrane electrode assembly 305 further include cycling a cathode potential of the cathode layer 330 relative to an anode potential of the anode layer 310. In particular, the cathode potential may be cycled from a minimum cathode potential, to an electro-oxidation cathode potential at which the cyanide source is electro-oxidized and catalytic surfaces 338 of the cathode catalyst particles 332 in the cathode layer 330 become functionalized with cyano groups 340 derived from the cyanide source, and back to the minimum cathode potential. The cycling of the cathode potential relative to the anode potential may be accomplished by connecting a suitable voltage-generating device (not shown) to the cathode layer 330 and the anode layer 310. For example, leads of the voltage-generating device may be connected to the cathode layer 330 and the anode layer 310 as schematically shown through the external electric circuit 400 of FIG. 2.

In some embodiments, a fuel such as hydrogen may be flowed through the anode channel 315 while the cathode potential is cycled. In such embodiments, the anode potential is effectively that of a standard-hydrogen electrode. If the anode potential is defined as 0 V, the minimum cathode potential may be from 0.0 V or 0.05 V to about 0.1 V or 0.3 V, for example. Also if the anode potential is defined as 0 V, the electro-oxidation cathode potential depends on the cyanide source present in the cathode layer 330. For example, if the cyanide source is an amino acid such as alanine, serine, or mixtures thereof, the electro-oxidation potential may be from about 1.1 V to about 1.3 V. During the cycling of the cathode potential, it is believed that cyano groups may bind to the catalytic surfaces 338 of the cathode catalyst particles 332 in a configuration that leaves active surfaces for the ORR while sterically hindering the bonding of contaminant species 360 or ionomer molecules to the catalytic surfaces 338 in a manner that reduces catalyst activity. Examples of such configurations have been described above with reference to FIGS. 5A and 5B. It is believed that the cyano groups 340 adsorb onto the catalytic surfaces 338 of the cathode catalyst particles 332 durably and effectively permanently, because the electrochemical potentials at which the cyano groups 340 might be expected to cause the cyano groups 340 to desorb naturally are considerably higher than the electrochemical potentials encountered during normal operation of a fuel-cell assembly 300 or a fuel-cell system including a fuel-cell assembly 300.

Without intent to be bound by theory, it is believed that cycling the cathode potential of the cathode layer 330 to the electro-oxidation potential may result in formation of cyanide species through electro-oxidation of the cyanide source. Using the amino acid glycine as an illustrative example, electro-oxidation of the glycine implies a cleavage of a carbon-carbon bond with the generation of a $CO_2$ molecule from a carboxyl group. If monitored by FTIR, generation of $CO_2$ may be evidenced by an absorption band at 2344 cm$^{-1}$. It is believed that electro-oxidation of glycine may occur by the half-reaction of Equation (1):

$$Pt+NH_3^+—CH_2—COOH \rightarrow Pt—CN+CO_2+6H^++5e^- \qquad (1)$$

Consistent with the above half-reaction it is believed that, cyanide adsorbate may be formed directly on the platinum catalyst surface during the electro-oxidation process of the glycine, and that $CO_2$ may be released as gas product. Although this illustrative example described electro-oxidation of an amino acid, it will be appreciated by those skilled in the art that the cyanide source is not limited to amino acids. For example, modification of electrocatalyst properties on the catalytic surface 338 of the cathode catalyst particles 332 may be made from direct adsorption of cyanide from a salt solution such as potassium cyanide. Likewise, acetonitrile, may also be suitable for functionalizing platinum surfaces with cyano groups.

In some embodiments, preparation methods for the membrane electrode assembly may further include performing a recovery cycle after cycling the cathode potential. In such embodiments, performing the recovery cycle may include flowing an oxidant such as oxygen or air through the cathode channel 335 while flowing a fuel such as hydrogen through the anode channel 315 to operate the fuel-cell assembly 300 in an electricity-generating mode and desorb electro-oxidation byproducts from the catalytic surfaces. While the fuel-cell assembly 300 is operated, the method may further include purging the electro-oxidation byproducts from the cathode channel 335 while the oxidant is flowing through the cathode channel 335. In some embodiments, when the cyanide source is electro-oxidized to cause cyano groups 340 to functionalize the catalytic surfaces 338 of the cathode catalyst particles 332, byproducts may form that may be detrimental to fuel-cell operation. For example, if glycine is used as the cyanide source, carbon dioxide and/or glycinate ions or salts may form. In one illustrative embodiment, the cyanide source is an amino acid comprising glycine or consisting of glycine and the electro-oxidation byproducts comprise glycinate. In general, the recovery cycle may involve simply operating the fuel-cell assembly 300 normally in its electricity-generating mode, such that a voltage would be measurable across a load in the external electric circuit 400 in electrical continuity with both the cathode layer 330 and the anode layer 310 of the membrane electrode assembly 305.

In some embodiments, preparation methods for the membrane electrode assembly 305 may further include repeating the cycling of the cathode potential and the performing of the recovery cycle until the catalytic surfaces 338 are functionalized with a monolayer of cyano groups 340. In some illustrative embodiments, the cycling of the cathode potential and the performing of the recovery cycle may be repeated once, twice, up to five times, up to 10 times, or even up to 100 times. A monolayer of cyano groups 340 on the catalytic surfaces 338 is believed to represent a peak improvement of catalyst activity. The monolayer nevertheless may include a maximum number of cyano groups 340 on the catalytic surfaces 338 that are configured to leave active zones 339 of the catalytic surfaces 338 open to oxygen adsorption while still preventing adsorption of contaminant species 360 such as sulfate ions, phosphate ions, or sulfonate groups from the ionomer molecules 380.

Exemplary embodiments of methods for functionalizing the catalytic surfaces 338 of cathode catalyst particles 332 in a membrane electrode assembly 305 of a fuel-cell assembly 300 according to one or more of the embodiments above will now be described. In the methods for functionalizing the catalytic surfaces 338, the fuel-cell assembly 300 includes a membrane electrode assembly 305 comprising an electrolyte membrane 320, a cathode layer 330 disposed on a first side 321 of the electrolyte membrane 320, and an anode layer 310 disposed on a second side 322 of the electrolyte membrane 320 opposite the first side 321. The fuel-cell assembly 300 also includes a cathode channel 335 in fluidic communication with cathode catalyst particles 332 of a cathode catalyst material in the cathode layer 330 and an anode channel 315 in fluidic communication with anode catalytic particles 312 of an anode catalyst material in the anode layer 310. The fuel-cell assembly 300 also includes an external electric circuit 400 in electrical continuity with the anode layer 310 and the cathode layer 330.

According to some embodiments, the methods for functionalizing the catalytic surfaces 338 of catalyst particles in the membrane electrode assembly 305 of the fuel-cell assembly 300 may include flowing a gas stream through the cathode channel 335. In some embodiments, the gas stream may include a carrier gas and a cyanide source. The carrier gas may be any gas suitable for providing the cyanide source to the cathode catalyst material. In some embodiments, the carrier gas may be an inert gas such as nitrogen or argon. In other embodiments, the carrier gas may be oxygen, air, or water vapor. The cyanide source may be any chemical compound that forms cyano groups on electro-oxidation, including but not limited to acetonitrile, hydrogen cyanide, cyanide salts such as sodium cyanide or potassium cyanide, or amino acids. In preferred embodiments, the cyanide source is an amino acid. In especially preferred embodiments, the cyanide source is an amino acid comprising glycine, alanine, serine, or mixtures thereof. The cyanide source may be a solid, a liquid, or a gas. In some embodiments, the cyanide source is a finely dispersed solid such as an aerosol, for example, or an atomized liquid. In other embodiments, the cyanide source may be a solid dissolved in water vapor within the carrier gas, such that once the water vapor contacts the cathode catalytic surfaces, the cyanide source may precipitate from the water vapor and remain in contact with the cathode catalytic surfaces to be electro-oxidized.

The methods for functionalizing the catalytic surfaces 338 of cathode catalyst particles 332 in the membrane electrode assembly 305 of the fuel-cell assembly 300 may further include flowing a fuel through the anode channel 315 while the gas stream is flowing through the cathode channel 335. In some embodiments, the fuel may be hydrogen, so as to define the base electropotential of the anode layer as 0 V. Any fuel may be used that will enable the fuel-cell assembly 300 to operate in an electricity-generating mode once the cyanide source is introduced through the cathode channel 335.

The methods for functionalizing the catalytic surfaces 338 of cathode catalyst particles 332 in the membrane electrode assembly 305 of the fuel-cell assembly 300 may further cycling a cathode potential of the cathode layer 330 relative to an anode potential of the anode layer 310 from a minimum cathode potential, to an electro-oxidation cathode potential at which the amino acid is electro-oxidized and catalytic surfaces of the catalytic particles in the cathode layer become functionalized with cyano groups derived from the cyanide source, and back to the minimum cathode potential. The cycling of the cathode potential may occur during or after the flowing of the gas stream through the cathode channel 335 and the flowing of the fuel through the anode channel 315. In preferred embodiments, the cycling of the cathode potential is conducted while the gas stream is flowing through the cathode channel 335 and the fuel is flowing through the anode channel 315. In this regard, the cycling of the cathode potential resembles normal fuel-cell operation except that, instead of allowing the fuel-cell to generate electricity, electrical energy is inputted into the fuel-cell assembly 300 to control the cathode potential relative to the anode potential. The cycling of the cathode potential relative to the anode potential may be accomplished by connecting a suitable voltage-generating device (not shown) to the cathode layer 330 and the anode layer 310. For example, leads of the voltage-generating device may be connected to the cathode layer 330 and the anode layer 310 as schematically shown through the external electric circuit 400 of FIG. 2. Process details relating to cycling of the cathode potential have been described above with respect to the methods for preparation methods for the membrane electrode assembly 305. In this regard, the methods for preparation may differ from the methods for functionalizing the catalytic surfaces primarily in that the methods for functionalizing the catalytic surfaces may be conducted not only during manufacturing of the fuel-cell assembly, but also as a maintenance operation.

As in the preparation methods for the membrane electrode assembly the methods for functionalizing catalytic surfaces of catalyst particles in the membrane electrode assembly of the fuel cell assembly may further include performing a recovery cycle after cycling the cathode potential. In such embodiments, performing the recovery cycle may include flowing an oxidant such as air or oxygen through the cathode channel 335 while flowing a fuel such as hydrogen through the anode channel 315 to operate the fuel-cell assembly 300 in an electricity-generating mode and desorb electro-oxidation byproducts from the catalytic surfaces 338. While the fuel-cell assembly 300 is operated in this manner, the method may further include purging the electro-oxidation byproducts from the cathode channel 335 while the oxidant is flowing through the anode channel 315. In some embodiments, when the cyanide source is electro-oxidized to cause cyano groups 340 to functionalize the catalytic surfaces 338 of the cathode catalyst particles 332, byproducts may form that may be detrimental to fuel-cell operation. For example, if glycine is used as the cyanide source, carbon dioxide and/or glycinate ions or salts may form. In one illustrative embodiment, the cyanide source is an amino acid comprising glycine or consisting of glycine and the electro-oxidation byproducts comprise glycinate. In general, the recovery cycle may involve simply operating the fuel-cell assembly 300 normally in its electricity-generating mode, such that a voltage would be measurable across a load in the external electric circuit 400 in electrical continuity with both the cathode layer 330 and the anode layer 310 of the membrane electrode assembly 305.

In some embodiments, methods for functionalizing the catalytic surfaces 338 of cathode catalyst particles 332 in the membrane electrode assembly 305 of the fuel-cell assembly 300 may further include repeating the cycling of the cathode potential and the performing of the recovery cycle until the catalytic surfaces 338 are functionalized with a monolayer of cyano groups 340. In some illustrative embodiments, the cycling of the cathode potential and the performing of the recovery cycle may be repeated once, twice, up to five times, up to 10 times, or even up to 100 times. A monolayer of cyano groups 340 on the catalytic surfaces is believed to represent a peak improvement of catalyst activity. The monolayer nevertheless may include a maximum number of cyano groups on the catalytic surfaces that are configured to leave active zones 339 of the catalytic surfaces 338 open to adsorption of oxygen molecules 350 while still preventing adsorption of contaminant species 360 such as sulfate ions, phosphate ions, or bulky anions 387 such as sulfonate groups of ionomer material.

Thus, illustrative embodiments of fuel-cell assemblies 300, methods for preparing such membrane electrode assemblies 305 and fuel-cell assemblies 300, and methods for functionalizing the catalytic surfaces 338 of cathode catalyst particles 332 in the membrane electrode assemblies 305 of the fuel-cell assemblies 300 have been described. The fuel-cell assemblies 300 and their membrane electrode assemblies 305 contain cathode catalyst materials having catalytic surfaces 338 that are functionalized with cyano groups 340 believed to improve catalyst activity. In preferred embodiments, the cathode catalyst materials may include platinum or a platinum alloy and the cyano groups may be derived from a cyanide source. In exemplary embodiments, the cyanide source may include an amino acid such as glycine, alanine, or serine, for example.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

What is claimed is:

1. A method for preparing a membrane electrode assembly having functionalized cathode catalyst surfaces for use in a fuel-cell assembly having a cathode channel and an anode channel, the method comprising:
    applying electrodes to an electrolyte membrane to prepare the membrane electrode assembly, wherein applying the electrodes comprises:
        applying a catalytic ink to a first side of the electrolyte membrane to form a cathode layer on the first side, the catalytic ink comprising catalytic particles of a cathode catalyst material, electrically conductive particles, an ionomer binder, and a cyanide source; and
        applying an anode layer to a second side of the electrolyte membrane opposite the first side;
    placing the cathode layer in fluidic communication with the cathode channel of the fuel-cell assembly;
    placing the anode layer in fluidic communication with the anode channel of the fuel-cell assembly;
    cycling a cathode potential of the cathode layer relative to an anode potential of the anode layer from a minimum cathode potential, to an electro-oxidation cathode potential at which the cyanide source is electro-oxidized and catalytic surfaces of the catalytic particles in the cathode layer become functionalized with cyano groups derived from the cyanide source, and back to the minimum cathode potential, wherein the cyanide source is an amino acid selected from the group consisting of glycine, alanine, serine, and mixtures thereof.

2. The method of claim 1, wherein the cathode catalyst material is selected from the group consisting of platinum and platinum alloys.

3. The method of claim 1, further comprising flowing a fuel through the anode channel while the cathode potential is cycled.

4. The method of claim 3, wherein the fuel comprises hydrogen.

5. The method of claim 1, further comprising performing a recovery cycle after cycling the cathode potential, wherein performing the recovery cycle comprises:
    flowing an oxidant through the cathode channel while flowing a fuel through the anode channel to operate the fuel-cell assembly in an electricity-generating mode and desorb electro-oxidation byproducts from the catalytic surfaces; and
    purging the electro-oxidation byproducts from the cathode channel while the oxidant is flowing through the cathode channel.

6. The method of claim 5, wherein the cyanide source is an amino acid comprising glycine and the electro-oxidation byproducts comprise glycinate.

7. The method of claim 5, further comprising repeating the cycling of the cathode potential and the performing of the recovery cycle until the catalytic surfaces are functionalized with a monolayer of cyano groups.

8. A method for functionalizing catalytic surfaces of catalyst particles in a membrane electrode assembly of a fuel cell assembly, wherein the fuel-cell assembly comprises:
    a membrane electrode assembly comprising an electrolyte membrane, a cathode layer disposed on a first side of the electrolyte membrane, and an anode layer disposed on a second side of the electrolyte membrane opposite the first side;
    a cathode channel in fluidic communication with cathode catalytic particles of a cathode catalyst material in the cathode layer;
    an anode channel in fluidic communication with anode catalytic particles of an anode catalyst material in the anode layer; and
    an external electric circuit in electrical continuity with the anode layer and the cathode layer;
    the method comprising:
    flowing a gas stream through the cathode channel, the gas stream comprising a carrier gas and a cyanide source;
    flowing a fuel through the anode channel while flowing the gas stream through the cathode channel; and
    cycling a cathode potential of the cathode layer relative to an anode potential of the anode layer from a minimum cathode potential, to an electro-oxidation cathode potential at which the cyanide source is electro-oxidized and catalytic surfaces of the catalytic particles in the cathode layer become functionalized with cyano groups derived from the cyanide source, and back to the minimum cathode potential, wherein the cyanide source is an amino acid selected from the group consisting of glycine, alanine, serine, and mixtures thereof.

9. The method of claim 8, wherein the cathode catalyst material is selected from the group consisting of platinum and platinum alloys.

10. The method of claim 8, further comprising performing a recovery cycle after cycling the cathode potential, wherein performing the recovery cycle comprises:
    flowing an oxidant through the cathode channel while flowing fuel through the anode channel;

operating the fuel-cell assembly in an electricity-generating mode to cause desorption of electro-oxidation byproducts from the catalytic surfaces; and purging the electro-oxidation byproducts from the cathode channel while the oxidant is flowing through the cathode channel.

11. The method of claim 10, wherein the cyanide source is an amino acid comprising glycine and the electro-oxidation byproducts comprise glycinate.

12. The method of claim 10, further comprising repeating the cycling of the cathode potential and the performing of the recovery cycle until the catalytic surfaces are functionalized with a monolayer of cyano groups.

* * * * *